United States Patent
Dong et al.

(10) Patent No.: US 9,692,067 B2
(45) Date of Patent: Jun. 27, 2017

(54) BOP SYSTEM OF SOLID OXIDE FUEL CELL, SOLID OXIDE FUEL CELL STACK MODULE, AND METHOD FOR OPERATING THE SOLID OXIDE FUEL CELL

(71) Applicant: KOREA INSTITUTE OF ENERGY RESEARCH, Daejeon (KR)

(72) Inventors: Sang Keun Dong, Daejeon (KR); Je Bok Yang, Daejeon (KR); Sung Kook Hong, Cheongwon-gun (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 463 days.

(21) Appl. No.: 14/266,174

(22) Filed: Apr. 30, 2014

(65) Prior Publication Data

US 2015/0318564 A1    Nov. 5, 2015

(51) Int. Cl.
| | |
|---|---|
| *H01M 8/06* | (2016.01) |
| *H01M 8/04223* | (2016.01) |
| *H01M 8/04014* | (2016.01) |
| *H01M 8/0612* | (2016.01) |
| *H01M 8/1246* | (2016.01) |
| *C01B 3/32* | (2006.01) |
| *C01B 3/38* | (2006.01) |
| *H01M 8/124* | (2016.01) |

(52) U.S. Cl.
CPC ......... *H01M 8/04223* (2013.01); *C01B 3/323* (2013.01); *C01B 3/384* (2013.01); *H01M 8/04022* (2013.01); *H01M 8/0618* (2013.01); *H01M 8/0631* (2013.01); *H01M 8/1246* (2013.01); *C01B 2203/0233* (2013.01); *C01B 2203/066* (2013.01); *C01B 2203/0811* (2013.01); *C01B 2203/1229* (2013.01); *C01B 2203/1241* (2013.01); *C01B 2203/1288* (2013.01); *C01B 2203/82* (2013.01); *H01M 2008/1293* (2013.01); *H01M 2300/0074* (2013.01); *Y02P 20/129* (2015.11)

(58) Field of Classification Search
CPC ........... H01M 8/04022; H01M 8/0631; H01M 8/1246; H01M 2300/0074; H01M 2008/1293
USPC ....................................... 429/423
See application file for complete search history.

(56) References Cited

U.S. PATENT DOCUMENTS

2005/0208363 A1* 9/2005 Taylor ................ H01M 8/0625
                                                             429/423

FOREIGN PATENT DOCUMENTS

| JP | 2002-124289 A | 4/2002 |
|---|---|---|
| JP | 2007-311158 A | 11/2007 |
| JP | 2008-218277 A | 9/2008 |
| JP | 2014022230 A * | 2/2014 |
| KR | 10-1998-0044207 A | 9/1998 |

(Continued)

*Primary Examiner* — Gary Harris
(74) *Attorney, Agent, or Firm* — LRK Patent Law Firm (57) ABSTRACT

The present invention relates to a balance of plant (BOP) system of solid oxide fuel cells including a burner, a reformer, a steam generator, and heat exchangers, wherein the burner, the reformer and the steam generator are laid sequentially on top of each other to transmit the flames and burned gas generated from the burner directly to the reformer and the steam generator disposed sequentially on top of the burner, and the heat exchangers introduce the flue gas discharged from the steam generator thereinto and preheat the process air to be supplied to cathodes of stacks.

14 Claims, 9 Drawing Sheets

(56) References Cited

FOREIGN PATENT DOCUMENTS

KR    10-2003-0044346 A    6/2003
KR    10-2006-0054748 A    5/2006

* cited by examiner

BOP SYSTEM OF SOLID OXIDE FUEL CELL, SOLID OXIDE FUEL CELL STACK MODULE, AND METHOD FOR OPERATING THE SOLID OXIDE FUEL CELL

BACKGROUND OF THE INVENTION

Field of the Invention

The present invention relates to a balance of plant (hereinafter simply referred to as 'BOP') system of solid oxide fuel cells, a solid oxide fuel cell stack module, and a method for operating solid oxide fuel cells wherein hydrogen and oxygen are reacted with each other by the supply of hydrocarbon fuel to produce electricity therefrom.

Background of the Related Art

Basically, a fuel cell is a device which produces electricity with electrons produced by the reaction of hydrogen and oxygen. If water electrolysis is conducted, in more detail, oxygen and hydrogen are generated from the electrodes, and in this case, the fuel cell makes use of the reverse reaction of the water electrolysis to produce electricity and water from the hydrogen and oxygen. The hydrogen and air (oxygen) are supplied to an anode and a cathode and reacted with an electrolyte to form ions. In the process of forming water through the electrochemical reaction with the produced ions, electrons are produced from the anode and moved to the cathode, thus producing electricity and further generating heat. Unlike general chemical cells (for example, batteries, storage batteries and so on), the fuel cell can continuously produce electricity only if hydrogen and oxygen are supplied thereto.

Electricity is generated from one fuel cell, but the amount of electricity generated is very small if used really. Accordingly, a large number of fuel cells are stacked in series to produce a large amount of electricity therefrom, which is called a fuel cell stack.

The fuel of the fuel cell makes use of pure hydrogen, and otherwise, makes use of hydrogen produced through a process of reforming hydrocarbon like methane, ethanol and so on. On the other hand, the pure hydrogen enhances the efficiency of the fuel cell, but undesirably increases the cost and weight due to the storage of oxygen. Instead of oxygen, accordingly, air is used.

On the other hand, the fuel cell using hydrocarbon as fuel is called a solid oxide fuel cell. Referring schematically to solid oxide fuel cells in the conventional practice, for example, the conventional solid oxide fuel cells include a stack having anodes and cathodes located on both sides thereof and electrolytes provided between the anodes and cathodes to produce electricity through the electrochemical reaction with the hydrogen and oxygen supplied to the anodes and cathodes, a reformer for transforming fuel gas into hydrogen so as to supply the hydrogen to the anodes of the stack, an after burner for heating the reformer and a steam generator, a heater for preheating the air supplied to the cathodes, and the steam generator for supplying steam to the reformer.

According to the solid oxide fuel cells in the conventional practice, the components are connected with each other by means of various pipes and valves, which makes the whole piping configuration undesirably complicated and causes the heat loss in the fluid transmission and heat transmission among the components.

Further, a startup burner is additionally disposed on the outside of the system, which requires separate manufacturing costs and causes low heat efficiencies.

Furthermore, a separate electric heater is provided to preheat the air supplied to the inlets of the cathodes, which reduces the whole heat efficiency.

SUMMARY OF THE INVENTION

Accordingly, the present invention has been made in view of the above-mentioned problems occurring in the prior art, and it is an object of the present invention to provide a BOP system of solid oxide fuel cells, a solid oxide fuel cell stack module, and a method for operating solid oxide fuel cells wherein heat loss is minimized over the whole system, heat transmission and space efficiencies are optimized through neighboring heat supply sources and heat demand sources, low manufacturing cost and compact size are provided since no separate startup burner is needed, and heat efficiency is substantially improved by preheating flue gas, without any separate preheating heater disposed on the inlets of the cathodes of stacks.

To accomplish the above-mentioned object, according to a first aspect of the present invention, there is provided a BOP system of solid oxide fuel cells including a burner, a reformer, a steam generator, and heat exchangers, wherein the burner, the reformer and the steam generator are laid sequentially on top of each other to transmit the flames and burned gas generated from the burner directly to the reformer and the steam generator disposed sequentially on top of the burner.

According to the present invention, desirably, the heat exchangers introduce the flue gas discharged from the steam generator thereinto and preheat the process air to be supplied to cathodes of stacks.

To accomplish the above-mentioned object, according to a second aspect of the present invention, there is provided a solid oxide fuel cell stack module including stacks, a burner, a reformer, a steam generator, and heat exchangers, wherein the burner, the reformer and the steam generator are laid sequentially on top of each other to transmit the flames and burned gas generated from the burner directly to the reformer and the steam generator disposed sequentially on top of the burner, and the heat exchangers introduce the flue gas discharged from the steam generator thereinto and preheat the process air to be supplied to cathodes of the stacks.

To accomplish the above-mentioned object, according to a third aspect of the present invention, there is provided a method for operating solid oxide fuel cells including: the heating step of laying a burner, a reformer, and a steam generator sequentially on top of each other to transmit the flames and burned gas generated from the burner directly to the reformer and the steam generator disposed sequentially on top of the burner; and the preheating step of introducing the flue gas discharged from the steam generator into the heat exchangers to preheat the process air to be supplied to cathodes of stacks.

According to the present invention, desirably, the heating step includes the startup heating step of additionally supplying startup fuel to the burner and the postheating step of stopping the supply of the startup fuel if the reformer is heated to a given temperature or more and conducting the combustion of the unburned gas supplied from the stacks.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a BOP system of solid oxide fuel cells according to the present invention will be in detail given with reference to the attached drawing.

Figure 1:
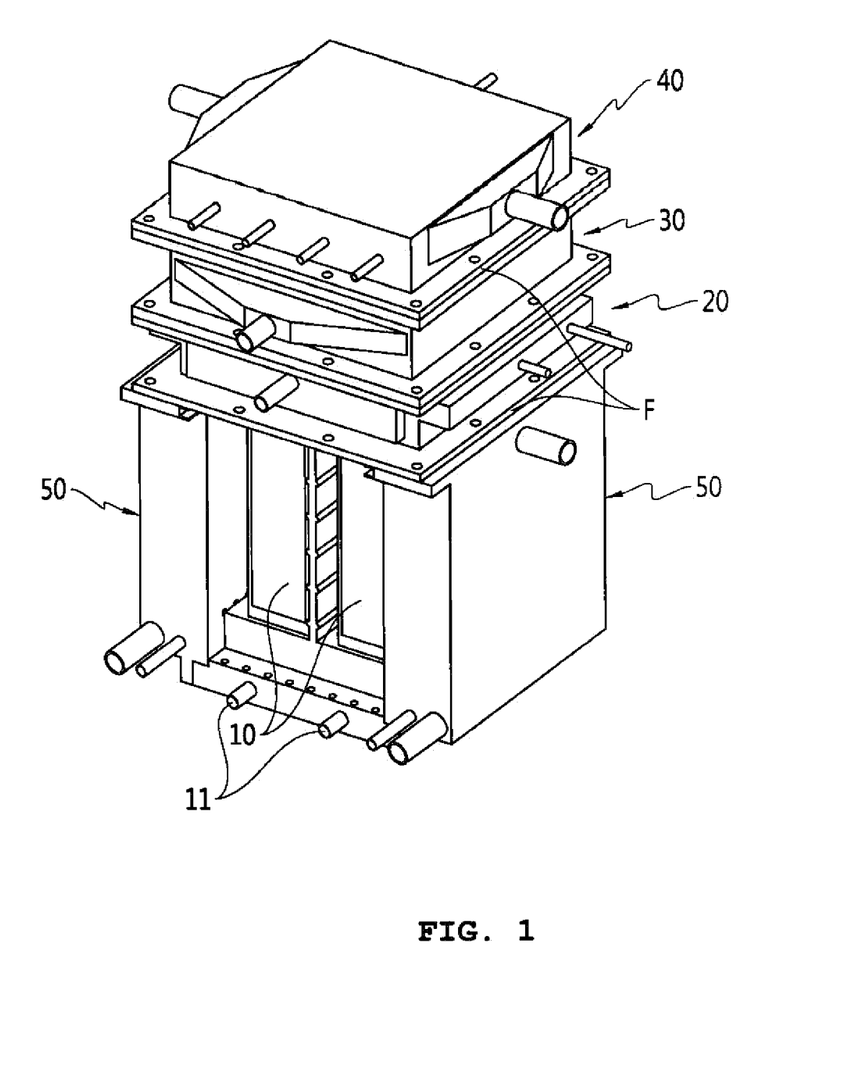
FIG. 1 is a perspective view showing the main components of independent type solid oxide fuel cells with which a BOP system according to the present invention is combined and the coupled relation between the components.

FIG. 1 is a perspective view showing the main components of independent type solid oxide fuel cells with which a BOP system according to the present invention is combined and the coupled relation between the components.

As shown in FIG. 1, a BOP system of solid oxide fuel cells according to the present invention largely includes a burner 20, a reformer 30, a steam generator 40, and heat exchangers 50.

According to the present invention, the BOP system of the solid oxide fuel cells has the heat exchangers 50 disposed around stacks 10 at the left and right sides thereof, and the burner 20, the reformer 30 and the steam generator 40 laid sequentially on top of the stacks 10 and the heat exchangers 50, thus optimizing the space efficiency.

The burner 20, the reformer 30 and the steam generator 40 are laid on top of each other by means of the coupling of their respective flanges, and the entire portion of the BOP system except all pipe connection portions of the stacks 10, the burner 20, the reformer 30 and the steam generator 40 is sealed to minimize the heat loss generated therein.

Further, the high temperature unburned gas generated from the stacks 10 disposed on the underside of the burner 20 is transmitted directly to the burner 20, without having any separate connection pipes.

Figure 2:
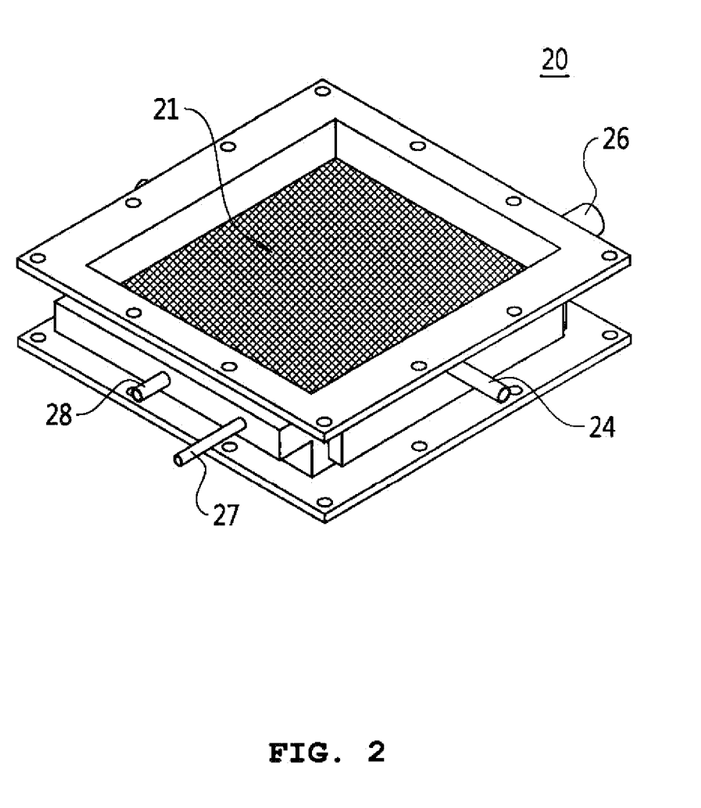
FIGS. 2 and 3 are perspective and plan views showing a burner in the BOP system of the solid oxide fuel cells according to the present invention.
Figure 3:
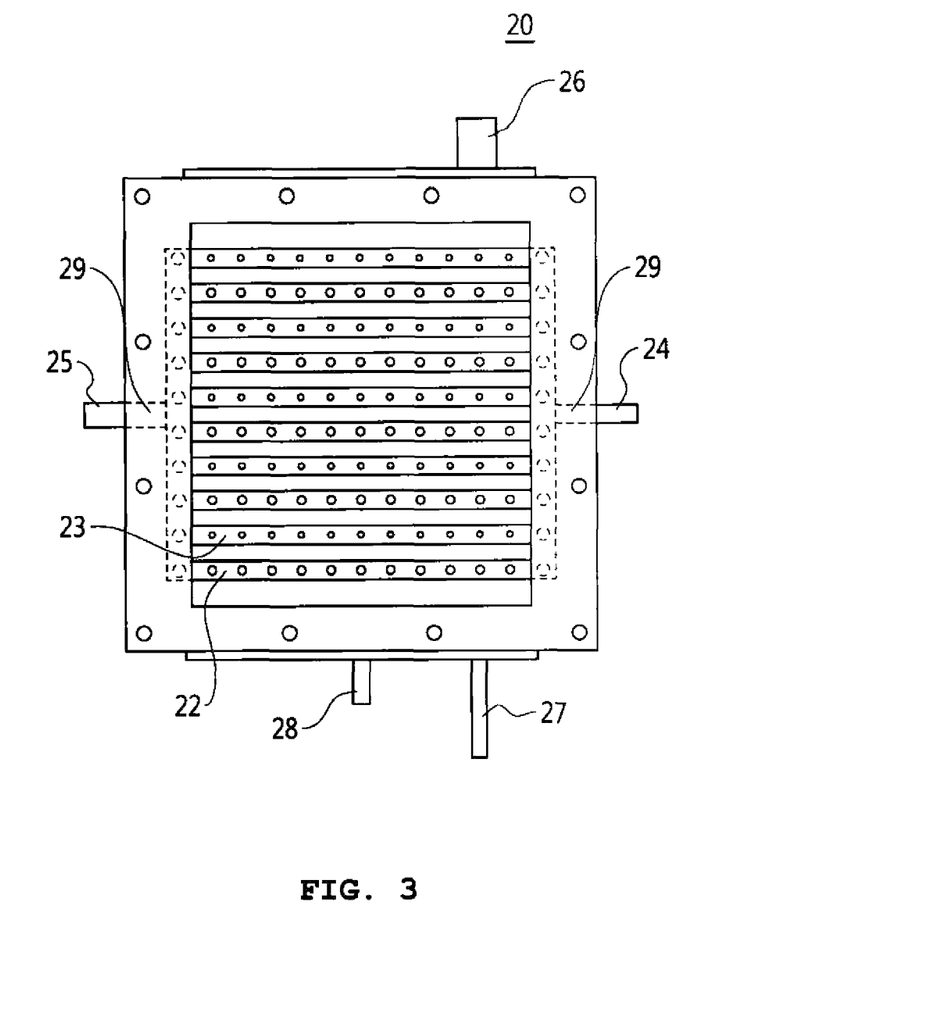

FIGS. 2 and 3 are perspective and plan views showing the burner in the BOP system of the solid oxide fuel cells according to the present invention.

According to the present invention, the burner 20 has an air inlet port 25 formed on one side surface thereof and a startup fuel inlet port 24 formed on the other side surface thereof.

The burner 20 is an integrated burner with which a function as a startup burner is added, so that upon startup, the burner 20 directly supplies fuel gas to the startup fuel inlet port 24 to allow the reformer 30 and the steam generator 40 disposed on top thereof to be heated.

If the reformer 30 reaches a given temperature or more, further, the burner 20 stops supplying the fuel gas to conduct the combustion only with the unburned gas supplied from the stacks 10 disposed on the underside thereof.

While the BOP system is being operated in the state where the reformer 30 reaches the given temperature or more, the amount of unburned gas supplied to the burner 20, after the unburned gas has been supplied to the stacks 10 from the reformer 30 and completed the reaction in the stacks 10, is sufficient, but when the BOP system starts up, the reformer 30 and the steam generator 40 are in a state of a low temperature, so that the reforming reaction and the steam generation are not gently conducted to cause the amount of unburned gas supplied to the burner 20 to be insufficient.

In case of the conventional burner, the startup burner and the after burner are provided independently of each other, but according to the present invention, the burner 20 is provided in the form of the integrated burner, thus making the BOP system compact and enhancing the manufacturing efficiency.

The top of the stacks 10 and the underside of the burner 20 are open in such a manner as to be connected with each other, which allows the amount of unburned gas to be not controlled and controls whether the startup fuel is supplied or not. That is, upon startup, the startup fuel is additionally supplied to the side surface of the burner 20, and if the reformer 30 reaches the given temperature or more, the supply of the startup fuel to the burner 20 stops, while the combustion is being conducted with only the unburned gas.

On the other hand, the burner 20 desirably has a form of a metal fiber surface combustion burner that transmits uniform calories to the whole surface of the reformer 30 and the steam generator 40 disposed on top thereof.

The unburned gas is relatively uniformly supplied from the stacks 10 disposed on the underside of the burner 20 to the interior of the burner 20, but since the startup fuel is supplied to the side surface of the burner 20, desirably, a plurality of gas supply nozzle tubes 22 is equally spaced apart from each other in the interior of the burner 20 so as to conduct the uniform combustion in the metal fiber surface combustion burner.

As the air supply to the burner 20 has an influence on the degree of local combustion, desirably, a plurality of air supply nozzle tubes 23 is disposed between the neighboring gas supply nozzle tubes 22.

So as to appropriately adjust the ratio of the fuel gas to the air, desirably, the sizes of the nozzle holes formed on each gas supply nozzle tube 22 and each air supply nozzle tube 23 are formed in the ratio of 1:4.

On the other hand, the gas supply nozzle tubes 22 and the air supply nozzle tubes 23 are disposed under a metal fiber 21 so as to inject the flames into the metal fiber 21, and so as to conduct heating more uniformly, desirably, a perforated plate is further disposed between the metal fiber 21 and the air supply nozzle tubes 22 and the gas supply nozzle tubes 23.

So as to constantly distribute the air and gas supplied to the air supply nozzle tubes 23 and the gas supply nozzle tubes 23, further, the inlet sides of the gas supply nozzle tubes 23 and the air supply nozzle tubes 22 are connected to the air inlet port 25 and the startup fuel inlet port 24 by means of manifolders 29.

Further, the burner 20 has an igniter mounting port 26 formed on the side surface thereof into which an igniter is mounted, thus conducting startup ignition, and has a pressure sensor mounting port 27 and a temperature sensor mounting port 28 formed on the side surface thereof into which a pressure sensor and a temperature sensor are mounted, thus conducting the monitoring for the pressure and temperature in the burner 20.

Figure 4:
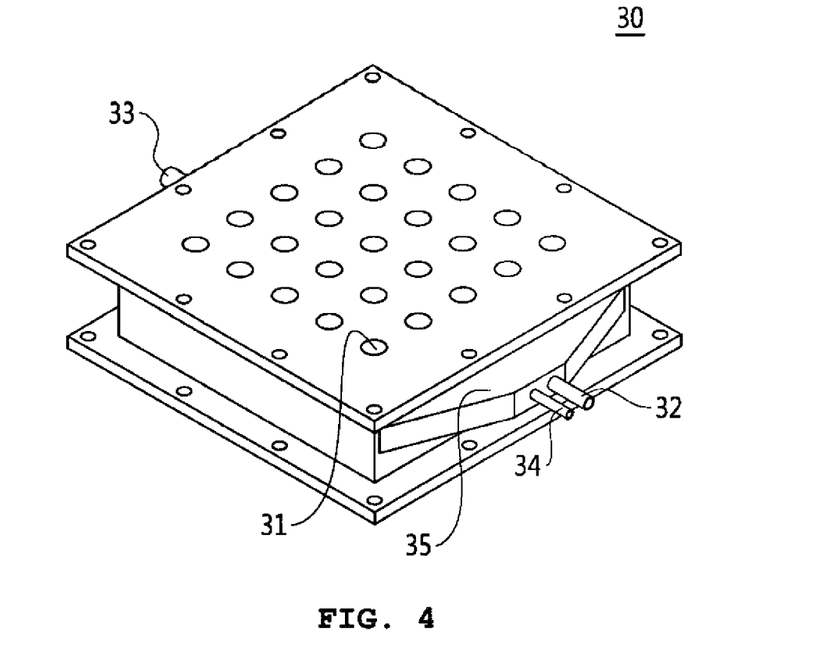
FIGS. 4 and 5 are perspective and plan views showing a reformer in the BOP system of the solid oxide fuel cells according to the present invention.
Figure 5:
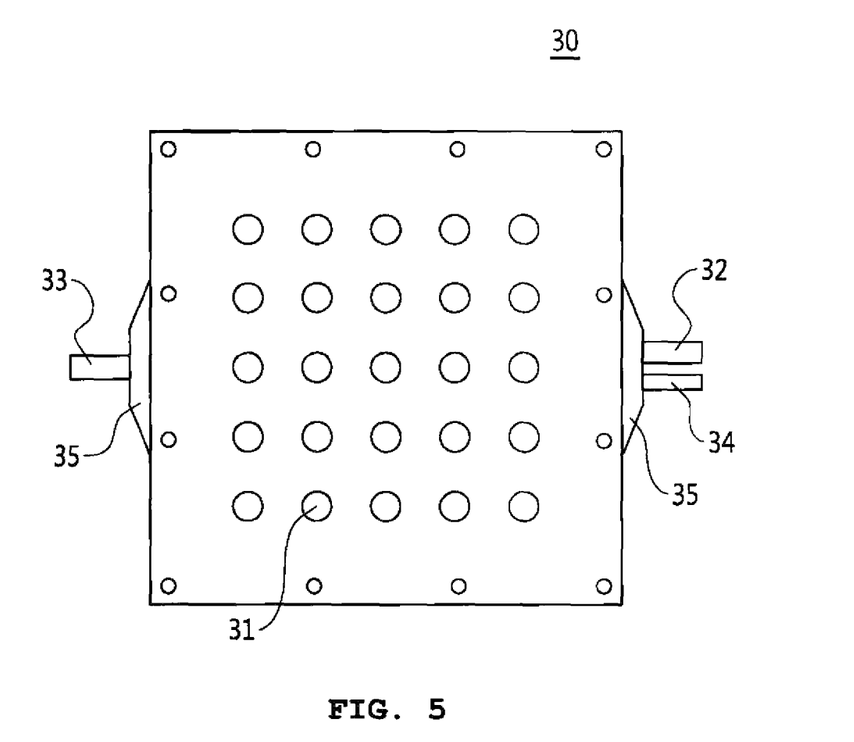

FIGS. 4 and 5 are perspective and plan views showing the reformer in the BOP system of the solid oxide fuel cells according to the present invention.

As shown in FIGS. 4 and 5, the reformer 30 has a fuel inlet port 32 and a steam inlet port 34 formed on one side surface thereof and a reformed gas outlet port 33 formed on the other side surface thereof. The fuel gas is introduced into the fuel inlet port 32 and mixed with the steam introduced into the steam inlet port 34 and the catalysts filled in the reformer 30, thus causing reforming reaction therein. The reformed gas is exhausted through the reformed gas outlet port 34 and introduced into the stacks 10 through reformed gas inlet ports 11 formed on the lower sides of the front surfaces of the stacks 10.

The reformer 30 is filled with the catalysts therein, and in more detail, the catalysts are filled through a catalyst inlet port (not shown). After filling, the catalyst inlet port is sealed with a male connector sealing device (not shown).

Further, the reformer 30 has a plurality of through holes 31 formed on the whole plan surface thereof so as to transmit the flames and burned gas generated from the burner 20 disposed on the underside thereof to the steam generator 40 disposed on the top thereof. That is, heat transmission occurs from the flames and burned gas passed through the plurality of through holes 31 to the interior of the reformer 30, and the reforming reaction is accelerated using the transmitted heat.

On the other hand, the casing of the reformer 30, which is directly contacted with the flames of the burner 20, is desirably formed of an Inconel plate formed integrally with the flanges thereof so as to avoid high heat applied thereto and its corrosion. Also, the through holes 31 are desirably formed of Inconel tubes. Inconel is a heat-resistant alloy made of nickel as a main material to which 15% chromium, 6-7% iron, 2.5% titanium, and 1% or less aluminum, manganese and silicon are added. Inconel has excellent heat resistance and is not oxidized in the oxidation airflow of 900° C. or more. Further, Inconel does not corrode in the air containing sulfur. Also, Inconel is not changed up to 600° C. in various properties such as elongation, tension strength, yield point and the like and does not corrode in organic matters and salt solution.

On the other hand, the casing of the reformer 30 is entirely sealed by means of a stainless plate except the inlet ports and the outlet port.

Further, the reformer 30 has mesh nets formed on both side surfaces thereof so as to supply the reformed fuel gas and steam to one side surface in the vertical direction thereof and exhaust the reformed gas to the other side surface thereof after the catalysts have been filled into the reformer 30. So as to prevent the supplied reformed fuel gas and steam from being collectively contacted with the catalysts filled into the reformer 30, the casing of the reformer has both side surfaces having a shape of a cone 35, so that the reformed fuel gas and steam can be uniformly contacted with all of the catalysts.

Figure 6:
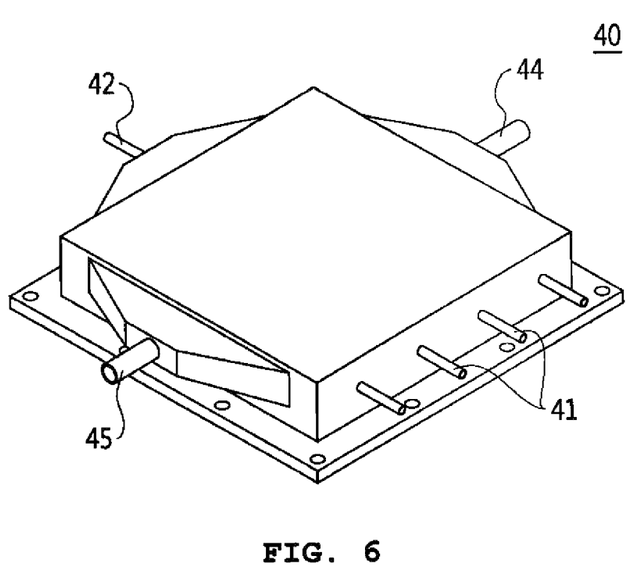
FIGS. 6 and 7 are perspective and plan views showing a steam generator in the BOP system of the solid oxide fuel cells according to the present invention.
Figure 7:
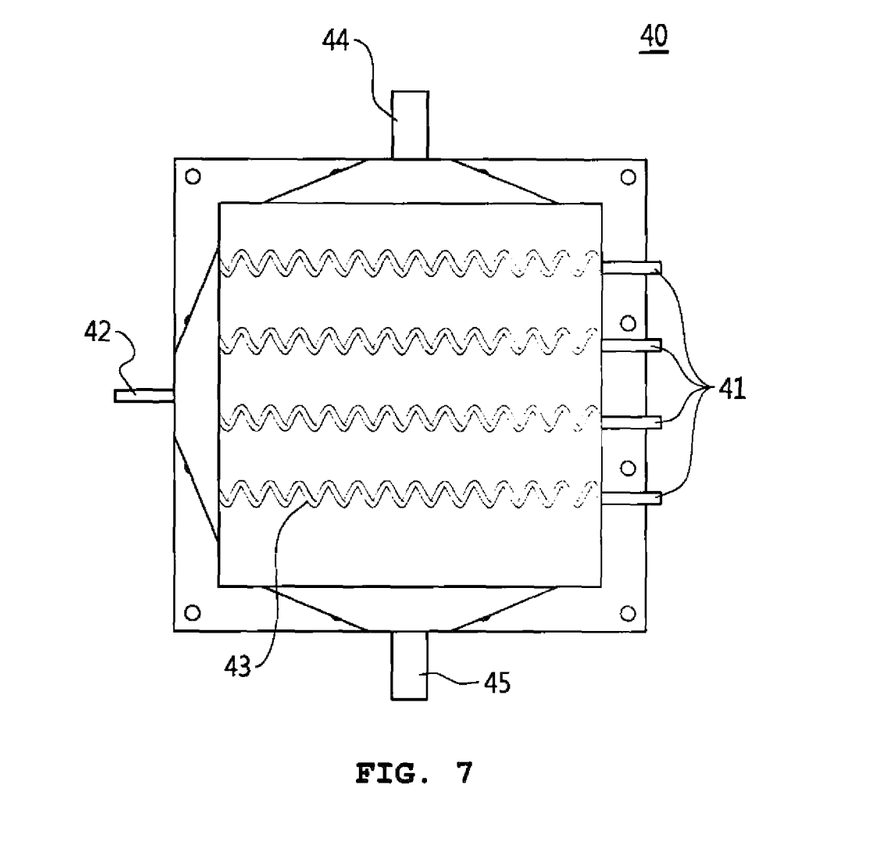

FIGS. 6 and 7 are perspective and plan views showing the steam generator in the BOP system of the solid oxide fuel cells according to the present invention.

As shown in FIGS. 6 and 7, the steam generator 40 has a plurality of water inlet ports 41 formed on one side surface thereof and a steam outlet port 42 formed on the other side surface thereof. The water introduced through the water inlet ports 41 is evaporated through coil-shaped evaporation tubes 43 having the number corresponding to the number of water inlet ports 41 in such a manner as to be extended from the water inlet ports 41. The steam generated from the evaporation tubes 43 is collected at the portion adjacent to the other side surface of the steam generator 40 and exhausted through the steam outlet port 42. The burned gas and flames generated from the burner 20 are transmitted to the underside of the steam generator 40, and most of the transmitted burned gas and flames are burned gas. The transmitted burned gas heats the evaporation tubes 43 to allow the water in the steam generator 40 to be evaporated and then discharged through flue gas outlet ports 44 and 45. The discharged flue gas is supplied to the heat exchangers 50 and used for preheating process gas.

Figure 8:
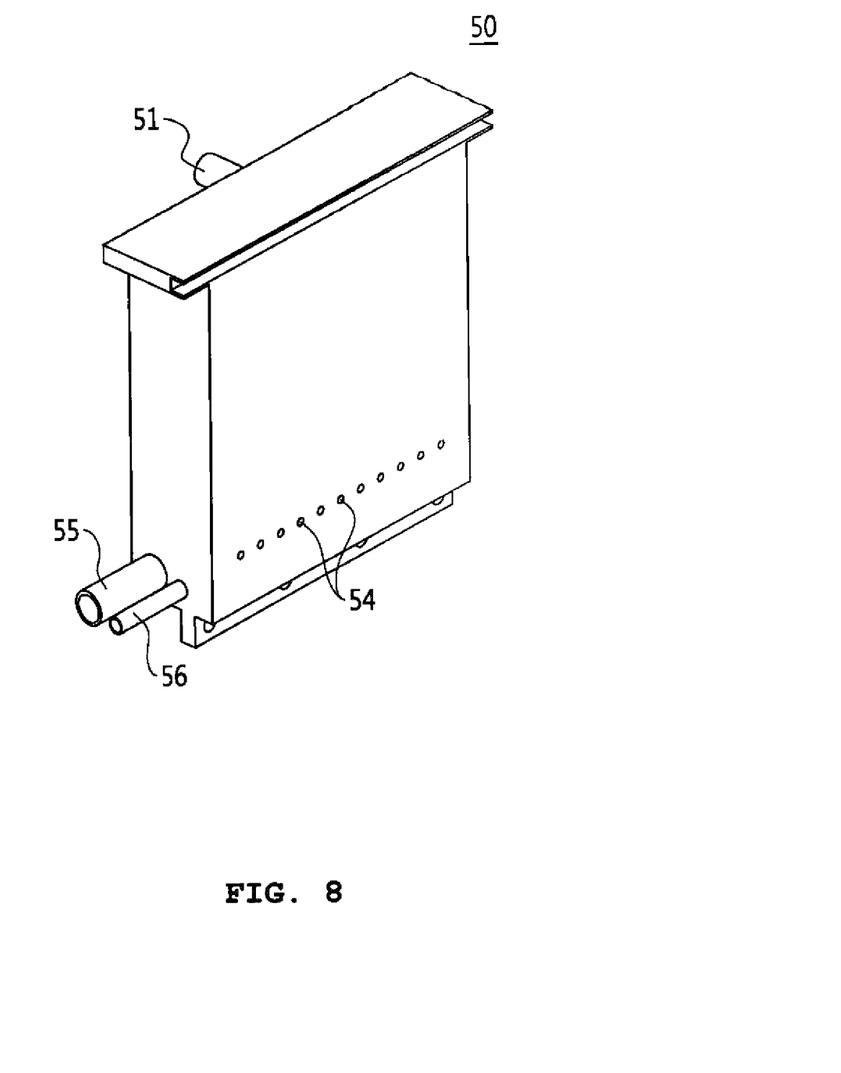
FIGS. 8 and 9 are perspective and plan views showing heat exchangers in the BOP system of the solid oxide fuel cells according to the present invention.
Figure 9:
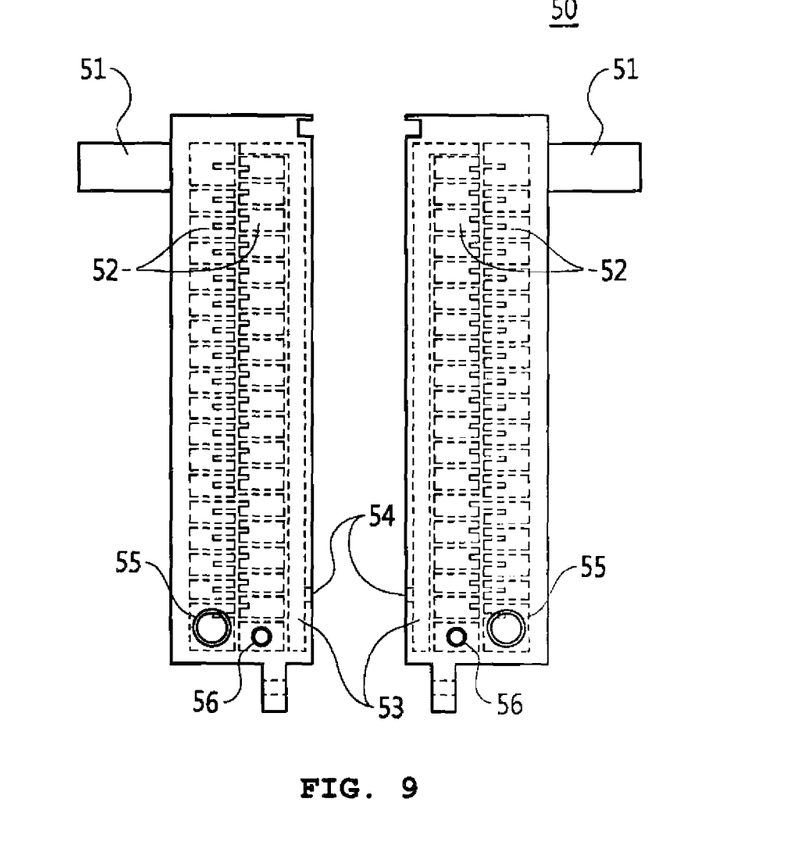

FIGS. 8 and 9 are perspective and plan views showing the heat exchangers in the BOP system of the solid oxide fuel cells according to the present invention.

As shown in FIGS. 1, 8 and 9, the heat exchangers have the shapes of vertical plates. One pair of heat exchangers 50 are disposed on both sides of the stacks 10 on the underside of the burner 20. The flue gas discharged from the steam generator 40 is supplied to a flue gas inlet port 51 formed on the upper portion of the opposite side surface of each heat exchanger 50 to the stacks 10, heat-exchanged with the air introduced from a process air inlet port 56 formed on the lower portion of the front surface of each heat exchanger 50, preheats the process air, and is then discharged through a heat-exchanged gas outlet port 55. Next, the preheated process air is introduced into the lower portions of both side surfaces of the stacks 10 through a plurality of process air outlet ports 54 formed on the stack side lower portion of each heat exchanger 50.

The heat exchangers 50 are fin type heat exchangers so as to enhance the heat exchanging efficiency and have a plurality of serpentine flow paths 52 formed therein. The process air is introduced from the lower portions of the heat exchangers 50, passed through the serpentine flow paths 52, and moved to the lower portions of the heat exchangers 50 through downward transforming flow paths 53 extended from the upper portions to the lower portions of the heat exchangers 50. Next, the process air is discharged to the interiors of the stacks 10 through the process air outlet ports 54 connected to the lower sides of the downward transforming flow paths 53. So as to allow the process air to be uniformly supplied to the interiors of the stacks 10, desirably, the process air outlet ports 54 are formed of a plurality of holes, and the serpentine flow paths 52 and the downward transforming flow paths 53 are formed in the interior of each heat exchanger 50 in the numbers corresponding to the number of process air outlet ports 54.

On the other hand, a method for operating the solid oxide fuel cells includes the heating step of laying the burner, the reformer, and the steam generator sequentially on top of each other to transmit the flames and burned gas generated from the burner directly to the reformer and the steam generator disposed sequentially on top of the burner; and the preheating step of introducing the flue gas discharged from the steam generator into the heat exchangers to preheat the process air to be supplied to cathodes of the stacks.

Further, the heating step includes the startup heating step of additionally supplying startup fuel to the burner and the postheating step of stopping the supply of the startup fuel if the reformer is heated to a given temperature or more and conducting the combustion of only the unburned gas supplied from the stacks.

Furthermore, the preheating step further includes the step of supplying the preheated process air to the cathodes of the stacks.

As described above, the stacks, the burner, the reformer and the steam generator are laid on top of each other by means of the coupling of their respective flanges, thus minimizing the heat loss to the outside, enhancing the heat transmission efficiency, and optimizing the space efficiency of the system.

In addition, the burner is provided as an integrated burner with which a function as a startup burner is added, without having any separate startup burner, thus reducing the manufacturing cost and improving the whole heat efficiency.

Moreover, the heat exchangers are provided, without any separate heaters, to preheat the process gas to be introduced into the cathodes by using the flue gas after the reaction, thus substantially improving the heat efficiency.

The positions of the components defined in the embodiment of the present invention are described with reference to the attached drawings, but they may be varied in accordance with the aspects of the present invention.

Terms used herein are for the purpose describing particular embodiments only and are not intended to be limiting of this disclosure. It will be understood that the terms defined in commonly used dictionaries should be interpreted as having a meaning that is consistent with their meaning in the context of the relevant art and will not be interpreted in an idealized or overly formal sense unless expressly so defined herein.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A balance of plant (BOP) system of solid oxide fuel cells comprising a burner, a reformer, a steam generator, and heat exchangers, wherein the burner, the reformer and the steam generator are laid sequentially on top of each other to transmit the flames and burned gas generated from the burner directly to the reformer and the steam generator disposed sequentially on top of the burner, and the heat exchangers introduce the flue gas discharged from the steam generator thereinto and preheat the process air to be supplied to cathodes of stacks, and wherein one pair of heat exchangers are disposed on both sides of the stacks and have an outside shape of a vertical plate and an inside shape of a fin type heat exchanger forming a plurality of serpentine flow paths therein.

2. The BOP system of solid oxide fuel cells according to claim 1, wherein the casings of the burner, the reformer and the steam generator are sealedly laid on top of each other by means of coupling of respective flanges.

3. The BOP system of solid oxide fuel cells according to claim 1, wherein the burner is an integrated burner which serves as a startup burner for supplying fuel gas upon startup and as an after burner for stopping the supply of the fuel gas and supplying the unburned gas and air supplied from the stacks if the reformer reaches a given temperature or more.

4. The BOP system of solid oxide fuel cells according to claim 1, wherein the burner has a form of a metal fiber surface combustion burner to perform uniform surface heating.

5. The BOP system of solid oxide fuel cells according to claim 4, wherein the metal fiber surface combustion burner comprises a plurality of air supply nozzle tubes and a plurality of gas supply nozzle tubes repeatedly disposed alternately with a given distance so as to perform uniform surface heating.

6. The BOP system of solid oxide fuel cells according to claim 5, wherein the metal fiber surface combustion burner further comprises a perforated plate disposed at a separate position by a given distance from the top of the air supply nozzle tubes and the gas supply nozzle tubes so as to prevent a metal fiber from sagging upon combustion and to conduct the mixing between the air and gas.

7. The BOP system of solid oxide fuel cells according to claim 5, wherein the inlet sides of the air supply nozzle tubes and the gas supply nozzle tubes are connected to an air inlet port and a startup fuel inlet port by means of a manifold.

8. The BOP system of solid oxide fuel cells according to claim 1, wherein the reformer has a plurality of through holes adapted to perform the heat transmission from the flames and burned gas generated from the burner to the interior of the reformer, while serving as a path supplying the flames and burned gas to the steam generator, not to the interior of the reformer.

9. The BOP system of solid oxide fuel cells according to claim 8, wherein the reformer comprises:
a fuel inlet port formed on one side surface thereof;
a steam inlet port formed on one side surface thereof so as to introduce the steam discharged from the steam generator thereinto; and
a reformed gas outlet port formed on the other side surface thereof so as to discharge the reformed gas therefrom, one side surface and the other side surface of the reformer having a shape of a cone so that the reformed fuel gas and the steam are uniformly discharged and introduced therefrom and thereinto.

10. The BOP system of solid oxide fuel cells according to claim 9, wherein the lower plate of the reformer with respect to the burner is formed of an Inconel plate, and the through holes are formed of Inconel tubes.

11. The BOP system of solid oxide fuel cells according to claim 9, wherein the reformer further comprises a catalyst inlet port formed for filling catalysts thereinto, and after filling the catalysts, the catalyst inlet port is sealed with a male connector sealing device.

12. The BOP system of solid oxide fuel cells according to claim 1, wherein the steam generator has flue gas outlet ports formed to discharge the burned gas transmitted from the burner therethrough, and the discharged flue gas is supplied to the heat exchangers and used for preheating the process gas to be supplied to the stacks.

13. The BOP system of solid oxide fuel cells according to claim 12, wherein the steam generator comprises:
at least two or more water inlet ports;
coil-shaped evaporation tubes having the corresponding number to the number of water inlet ports and extended from the water inlet ports in such a manner as to be passed through the interior of the steam generator; and
a steam outlet port at which the outlet sides of the evaporation tubes are collected to one in such a manner as to be extended to the outside of the steam generator, the steam outlet port being adapted to discharge the steam generated in the interior of the steam generator therethrough.

14. The BOP system of solid oxide fuel cells according to claim 1, wherein each heat exchanger comprises a flue gas inlet port formed on the upper portion of the opposite side surface of each heat exchanger to the stacks and a plurality of process air outlet ports formed on the lower portion of the side surface contacted with the stacks.

* * * * *